United States Patent [19]

Okazaki

[11] Patent Number: 5,408,009

[45] Date of Patent: Apr. 18, 1995

[54] HIGH POLYMER-NONLINEAR OPTICAL MATERIAL

[75] Inventor: Masaki Okazaki, Kanagawa, Japan

[73] Assignee: Fuji Photo Film Co., Ltd., Kanagawa, Japan

[21] Appl. No.: 144,426

[22] Filed: Nov. 2, 1993

[30] Foreign Application Priority Data

Nov. 2, 1992 [JP] Japan .................................. 4-294615

[51] Int. Cl.$^6$ .......................... C08F 28/06; C08F 26/06
[52] U.S. Cl. .............................. 525/326.8; 525/326.7; 525/279; 525/281; 526/257; 526/258; 526/260
[58] Field of Search ....................... 526/257, 258, 260; 525/279, 326.8, 326.7, 281

[56] References Cited

U.S. PATENT DOCUMENTS 4,915,491 4/1990 De Martino et al. ............... 350/330
5,256,784 10/1993 Francis et al. ....................... 544/294

FOREIGN PATENT DOCUMENTS 0343643 11/1989 European Pat. Off. .
5-65277 3/1993 Japan .

*Primary Examiner*—Mark Nagumo
*Attorney, Agent, or Firm*—Sughrue, Mion, Zinn, Macpeak & Seas

[57] ABSTRACT

A high polymer which is a precursor capable of forming a hydrogen bond at a temperature of 40° C. or more and a high polymer capable of forming a hydrogen bond, and a nonlinear optical material comprising a thin polymer film containing the high polymer and a method for forming the nonlinear optical material are disclosed. The thin polymer film containing the high polymer may be oriented in the electric field at a low temperature to give a nonlinear optical material.

5 Claims, 1 Drawing Sheet

HIGH POLYMER-NONLINEAR OPTICAL MATERIAL

FIELD OF THE INVENTION

The present invention relates to a high polymer material and a nonlinear polymeric optical material containing the material, which are suitable for various devices utilizing a nonlinear optical effect such as electrooptical devices, and also to a method of producing the nonlinear polymeric optical materials.

BACKGROUND OF THE INVENTION

Recently, much attention has been paid to a nonlinear optical material, which is to have a nonlinear optical property between its polarization and the electric field when a strong photoelectric field such as a laser ray has been imparted thereto.

This kind of material has generally been known as a nonlinear optical material and has been described in detail in, for example, *Nonlinear Optical Properties of Organic and Polymeric Material*, ACS SYMPOSIUM SERIES 233, David J. Williams (American Chemical Society, 1983); *Organic Nonlinear Optical Material*, M. Kato & H. Nakanishi (CMC Co., 1985); and *Nonlinear Optical Properties of Organic Molecules and Crystals*, Vol. 1 and Vol. 2, D. S. Chemla & J. Zyss (Academic Press Co.).

In order for the material to function effectively as a nonlinear optical material, the material must satisfy requirements in accordance with the order of the nonlinear optical effect for which it is to be utilized. For instance, for expression of a nonlinear optical effect of the second order, it is necessary that the polarization of the material to be induced by the electric field be asymmetric to the center. Heretofore, inorganic compounds such as lithium niobate (LN) and potassium dihydrogen phosphate (KDP) have been used as secondary nonlinear optical materials. However, these inorganic compounds could not always obtain a sufficient quality index, and much attention has come to be paid to $\pi$-electron-conjugated organic compounds having an electron-donating group and an electron-attracting group, which are expected to obtain a great latent quality index. Under this situation, utilizing single crystals of organic compounds as a secondary nonlinear optical material has been actively investigated, with the result of finding p-nitroaniline derivatives, chalcone derivatives and phenylazole derivatives (for instance, described in T. Kobayashi, M. Umegaki, H. Nakanishi & N. Nakamura, *New Organic Nonlinear Optical Material I, ibid. II*, (CMC Co., 1991)).

However, it is extremely difficult to control the molecules of such organic compounds to be arranged asymmetrically to the center, and the difficulty is a great bar to the development of excellent secondary nonlinear optical materials comprising single crystals of organic compounds. As a method of effectively utilizing the excellent capacity of the organic compounds in the level of their molecules, an attempt has been made to utilize a so-called electric field-oriented high polymer material comprising a combination of the above-mentioned $\pi$-electron-conjugated organic compound and a high polymer as a secondary nonlinear optical material, the material being oriented by imparting an electric field thereto. However, the electric field-oriented high polymer material has a drawback that the dipoles as oriented to one direction by the action of an electric field as imparted thereto are to be disordered (i.e., randomized) with the lapse of time, the disordering being called orientation relief, and a solution to this problem is desired (for instance, described in D. R. Ulrich, *Mol. Cryst. Lig. Cyrst.*, 1990, Vol. 198, pp. 3–38).

As one means of overcoming the problem of orientation-relaxation, use of a high polymer having a high glass transition temperature (Tg) may be proposed. However, the field orientation of the high polymer is generally effected by heating the high polymer at a temperature higher than its Tg so that the mobility of the molecules of the high polymer may be kept elevated. The elevation of Tg of the high polymer to be oriented is to elevate the temperature for the electric field-orientation. It is known that the nonlinear optical constant of the field-oriented high polymer is in inverse proportion to the temperature during the electric field-orientation of the polymer. Therefore, use of a high polymer having a high Tg is contradictory to the result of obtaining an electric field-oriented high polymer having a large nonlinear optical constant.

Because of these reasons, a high polymer material which may be oriented in an electric field at a low temperature without orientation-relaxation of the field-oriented material is desired.

SUMMARY OF THE INVENTION

One object of the present invention is to provide a high polymer material free from orientation-relaxation.

A second object of the present invention is to provide a high polymer material which may be subjected to low-temperature electric field-orientation without orientation-relaxation.

A third object of the present invention is to provide a nonlinear optical material containing the high polymer material.

A fourth object of the present invention is to provide a method for forming the nonlinear optical material containing the high polymer material.

The present inventors earnestly studied the abovedescribed issues and, as a result, have found that the first object of the present invention as noted above may be attained by employing a high polymer and preferably by employing a high polymer which contains a functional group having an electron-donating group and an electron-attracting group at opposite ends of a $\pi$-electron-conjugated system, the functional group being able to bond to another functional group by head-to-tail hydrogen bonding, particularly preferably by employing a high polymer containing the functional group represented by the following formula (I) and preferably the following formula (I.I).

The present inventors also have found that the second object of the present invention may be attained by employing a high polymer which is a precursor capable of forming a hydrogen bond, which contains a functional group having an electron-donating group and an electron-attracting group, at opposite ends of a $\pi$-electron-conjugated system; and which is a precursor containing the functional group capable of bonding by head-to-tail hydrogen bonding at a temperature of 40° C. or higher, particularly preferably by employing a high polymer containing a functional group represented by the following formula (III).

The present inventor further have found that the third object of the present invention may be attained by employing the above-mentioned high polymer material.

The present inventor still further have found that the fourth object of the present invention may be attained by employing the above mentioned high polymer material.

Formula (I)

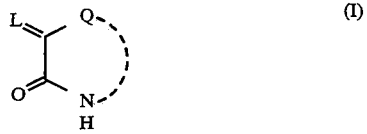

wherein Q represents an atomic group necessary for forming a 5- or 6-membered heterocyclic ring; and L represents a methine group or a group capable of bonding to the high polymer.

Formula (II)

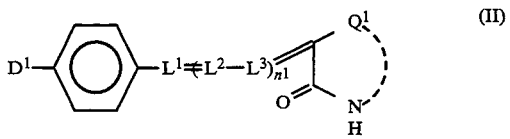

wherein $D^1$ represents an electron-donating group capable of forming a hydrogen bond;
$Q^1$ represents an atomic group necessary for forming a 5-membered or 6-membered heterocyclic ring; either one of $D^1$ and $Q^1$ has a group capable of bonding to a high polymer;
$L^1$, $L^2$ and $L^3$ each represent a methine group; and $n^1$ represents an integer of from 0 to 3.

Formula (III)

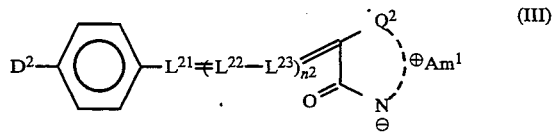

wherein $D^2$ represents an electron-donating group capable of forming a hydrogen bond;
$Q^2$ represents an atomic group necessary for forming a 5-membered or 6-membered heterocyclic ring;
either one of $D^2$ and $Q^2$ has a group capable of bonding to a high polymer;
$L^{21}$, $L^{22}$ and $L^{23}$ each represent a methine group;
$n^2$ represents an integer of from 0 to 3; and
$Am^1 \oplus$ represents an ammonium group.

DETAILED DESCRIPTION OF THE INVENTION

Figure 1:
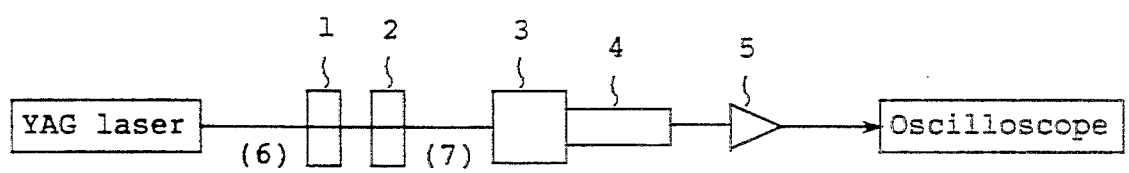
FIG. 1 shows a device for measurement of the SHG (Second Harmonic Generation) intensity of a high polymer sample, where 1 is a high polymer sample to be measured, 2 is a basic wave-cutting filter, 3 is a spectroscope, 4 is a photoelectron multiplier, 5 is an amplifier, 6 indicates a YAG laser beam with a wavelength of 1.064 μm, 7 indicates an SHG laser beam with a wavelength of 0.532 μm, and 8 is an oscilloscope.

High polymers of the present invention are explained in detail hereunder.

The electron-donating group as referred to herein indicates a substituent having a Hammett's substituent constant $\sigma p < 0$ or $\sigma p+ < 0$. The electron-attracting group as referred to herein indicates a substituent having a Hamett's substituent constant $\sigma p > 0$ or $\sigma p+ > 0$. Use of either of $\sigma p$ and $\sigma p+$ depends upon the property of the $\pi$-electron-conjugated system existing between the electron-donating group and the electron-attracting group. The Hammett's substituent constants are described in detail in, for example, Corwin Hansch, A. Leo & R. W. Taft, *Chemical Review*, Vol. 91 (1991), pp. 165-195.

The type of hydrogen bond to be formed by the substituents includes, for example, =N—H ... —N=, =N—H ... —O—, =N—H ... O=, =N—H ... F—, =N—H ... Cl—, —O—H ... —N=, —O—H ... —O—, —O—H ... O=, —O—H ... F—, and —O—H ... Cl—. The hydrogen bond of head-to-tail state (or type) as referred to herein indicates such that the electron-donating group always contains a hydrogen-donating group (for example, the group bonding to the hydrogen atom via the full line in the above illustrations) and the electron-attracting group always contains a hydrogen-receiving group (for example, the group bonding to the hydrogen atom via the dotted line in the above illustrations) in forming the hydrogen bond or vice versa.

The hydrogen bond of the head-to-tail state (or type) is found in the crystal structure, 5-(4-methoxybenzylidene)thiazolidine-2,4-dione, between the oxygen atom of the methoxy group and the 3-positioned hydrogen atom of the thiazolidine-2,4-dione ring. For example, the hydrogen bond is described in *J. Am. Chem. Soc.* (1987), 109, 7786-7797 and *Acc. Chem. Re.* (1990), 23, 120-126, and JP-A-5-65277 (the term "JP-A" as used herein means an "unexamined published Japanese patent application"). Therefore, the functional group represented by formula (I) is considered to form the hydrogen bond of head-to-tail type of this kind; and the functional group of formula (II) is considered to form a hydrogen bond of head-to-tail type after deamination. Further, use of phenols arid imides in addition to the thiazolidine-2,4-dione ring are also considered to form the hydrogen bond of head-to-tail type.

The $\pi$-electron-conjugated system as referred to herein indicates one comprising unsaturated bonds such as so-called double bonds or triple bonds, and it includes, for example, benzene-type aromatic groups such as benzene and naphthalene, non-benzene-type aromatic groups such as azuiene, cross-conjugated 5-membered or 6-membered heteroaromatic groups such as fulvene and fulvalene, and polyenes.

As examples of methods for incorporating the $\pi$-electron-conjugated functional group having an electron-donating group and an electron-attracting group into a high polymer, a method of incorporating the functional group by covalent bonding, a method of dispersing the functional group into a high polymer, a method of incorporating the functional group by ionic bonding, and a method of incorporating the functional group by inclusion to form a clathrate structure can be used. Of them, a method of incorporating the functional group into a high polymer by covalent bonding is preferred. For instance, the incorporation by covalent bonding is preferably effected in the manner to be represented by the following formula (VI) or (VII):

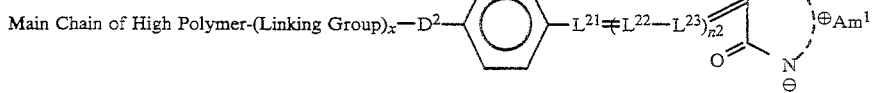

(VI)

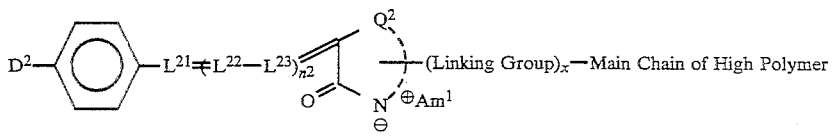

(VII)

x = 0 or 1

As examples of means of forming a precursor of the functional group capable of forming the hydrogen bond at a temperature of 40° C. or higher, a formation of salt (e.g., forming ammonium salt, carboxylate salt), a removing reaction (e.g., Reverse-Michael reaction, retro Dieis-Alder reaction), and a rearranging reaction (e.g., Claisen rearrangement-, Cope rearrangement) can be used. Of them, the formation of salt is preferred, and the formation of an ammonium salt of the group is especially preferred. As the ammonium salt, preferred are primary, secondary and tertiary ammonium salts. The temperature for the heating falls within the range of 40° C. or more, preferably from 40° C. to 150° C., more preferably from 40° C. to 100° C.. Specific examples of the formation will be described hereunder.

Groups represented by formulae (II) and (III) are explained in detail below.

The electron-donating group represented by $D^1$ and $D^2$ is a substituent having a Hammett's substituent constant $\sigma p < 0$ or $\sigma p+ < 0$, which may form hydrogen bond. It includes, for example, an amino group (e.g., amino, methylamino, ethylamino, n-propylamino, n-hexylamino, carbamoylamino, chloroacetylamino, methoxycarbonylamino, ethoxycarbonylamino, ethylcarbamoylamino, n-butyroxycarbonylamino, anilino, benzoylamino, 4-methoxybenzoylamino, dimethylamino), an alkoxy group (e.g., methoxy, ethoxy, 2-hydroxyethoxy, 2-methoxyethoxy, 1-methylethoxy, n-butoxy, 6-hydroxyhexyloxy, allyloxy), an aryloxy group (e.g., phenoxy, 4-fluorophenoxy), a hydroxyl group, a mercapto group, an alkylthio group (e.g., methylthio, ethylthio), an arylthio group (e.g., phenylthio), and a fluorine atom.

When the group bonds to a high polymer, a hydrogen atom being in a suitable position (for example, a hydrogen atom of hydroxyl group, a hydrogen atom of amino group and a hydrogen atom of alkyl group in an alkoxy group) in the group may be substituted by a high polymer or a linking group as described below.

Preferred $D^1$ and $D^2$ include, for example, —NH—, —N(CH$_3$)—, —N(C$_2$H$_5$)—, —CH$_2$CH$_2$NH—, —(CH$_2$)$_6$NH—, —O—, —CH$_2$CH$_2$O—, —(CH$_2$)$_6$—O—, -4—C$_6$H$_4$O—, -4—CH$_2$—C$_6$H$_4$O—, —S—, —CH$_2$CH$_2$S—, and -4—C$_6$H$_4$S—.

The 5-membered or 6-membered ring to be formed by Q, $Q^1$ or $Q^2$ includes, for example, 2-pyrazolin-5-one, imidazolin-4-one, hydantoin, 2-thiohydantoin, 2-iminoxazolidin-4-one, oxazolidine-2,4-dione, 2-thiooxooxazolidin-4-one, 2-thioxothiazolidin-4-one, thiazolidine-2,4-dione, rhodanine, indolin-2-one, barbituric acid and 2-thiobarbituric acid. Of them, preferred are 2-pyrazolin-5-one, imidazolin-4-one, oxazolidine-2,4- dione and thiazolidine-2,4-dione; and especially preferred are oxazolidine-2,4-dione and thiazolidine-2,4-dione.

When the ring bonds to a high polymer, a high polymer or a linking group may be bonded to a position of the above-mentioned nucleus of the ring, for example, to the 3-position of 2-pyrazolin-5-one, the 1- or 2-position of imidazolin-4-one, the 1-position of hydantoin or 2-thiohydantoin, the imino group of 2-iminoxazolidin-4-one, or the 3-position of barbituric acid or 2-thiobarbituric acid.

The methine group represented by L, $L^1$, $L^2$, $L^3$, $L^{21}$, $L^{22}$ and $L^{23}$ may optionally be substituted. As examples of substituents include a substituted or unsubstituted alkyl group (e.g., methyl, ethyl, 2-carboxyethyl), a substituted or unsubstituted aryl group (e.g., phenyl, o-carboxyphenyl), a halogen atom (e.g., chlorine, bromine), an alkoxy group (e.g., methoxy, ethoxy), and an alkylthio group (e.g., methylthio, ethylthio). The group may form a ring along with the other methine group(s) or may also form a ring along with an auxochromic group. Further, the group capable of bonding to the high polymer represented by L represents a group in which a linking group for $D^1$ and $D^2$ is substituted onto an alkyl group and an aryl group, and a linking group for bonding the π-electron-conjugated functional group to the main chain of the high polymer described below.

The ammonium group represented by Am$^{1\oplus}$ includes, for example, an ammonium group, an alkylammonium group (e.g., methylammonium, ethylammonium, cyclohexylammonium, 1-phenylethylammonium), a dialkylammonium group (e.g., dimethylammonium, diethylammonium, pyrrolidinium, piperidinium, morpholinium, piperazine-monoammonium, piperazine-bisammonium), a trialkylammonium group (e.g., trimethylammonium, triethylammonium, triethylenediamine-ammonium, triethylenediamine-bisammonium), a tetraalkylammonium group (e.g., tetramethylammonium, tetraethylammonium, benzyltrimethylammonium), an arylammonium group (e.g., anilinium, N-methylanilinium, N,N-diethylanilinium), a pyridinium group (e.g., pyridinium, 2-picolinium, 3-picolinium, 4-picolinium, 4-N,N-dimethylaminopyridinium), a 1,8-diazabicyclo[5,4,0]-7-undecenium group and a guanidinium group.

Of them, preferred are primary, secondary and tertiary alkylammonium groups. Especially preferred are secondary and tertiary alkylammonium groups.

By varying $n^1$ and $n^2$, the absorption wavelength range and the molecular ultra-polarizability ($\beta$) of the functional group may be controlled. Where the absorption wavelength of the group is desired to fall within a short wavelength range, $n^1$ and $n^2$ may be, for example, 0 (zero). Where the value ($\beta$) of the group is desired to be large, $n^1$ and $n^2$ may be, for example, 3.

The functional group represented by formula (II) is desired to bond to a high polymer represented by the following formula (VIII):

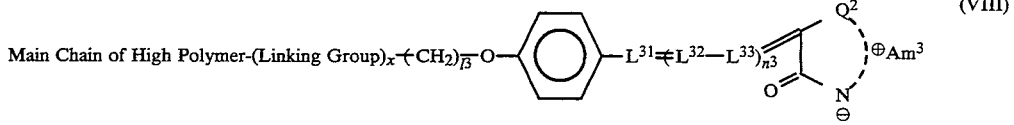

(VIII)

x = 0 or 1 wherein $L^{31}$, $L^{32}$ and $L^{33}$ each has the same meaning as those of $L^{21}$, $L^{22}$ and $L^{23}$; $Q^2$ has the same meaning as that of $Q^2$ defined above; $Am^{3\oplus}$ has the same meaning as that of $Am^{1\oplus}$; $l^3$ represents an integer of from 2 to 12; and $n^3$ has the same meaning as that of $n^2$.

As examples of the main chain of the high polymer for use in the present invention, mentioned include polystyrenes, polymalonates, polyacrylates, polymethacrylates, polysiloxanes, polyacrylamides, polymethacrylamides, polyoxyalkylenes, polyterephthalates, polyallylamines, polydicarboxylic acid amides, polyurethanes, polyoxyphenylenes, polyvinyl alcohols, and poly-co(vinylidene chloride)-(methacrylates).

For bonding the π-electron-conjugated functional group to the main chain of the above-mentioned high polymer, the former may be bonded directly to the latter or via a divalent group (so-called linking group) therebetween. As examples of the linking group, the following groups can be used.

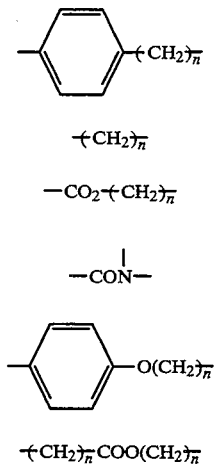

1.

2.

3.

4.

5.

6.

7.

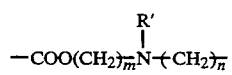

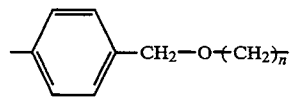  8.

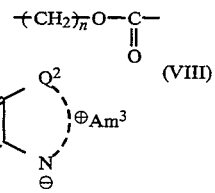  9.

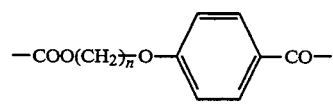  10.

—COO(CH$_2$)$_2$—NHCO—  11.

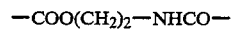  12.

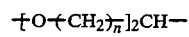  13.

m is an integer of 0 to 24.
n is an integer of 0 to 24.
R' is an alkyl group (e.g., methyl, ethyl) or an aryl group (e.g., phenyl, tolyl).

Preferred examples of the high polymer for use in the present invention may be represented by the following formula (IX):

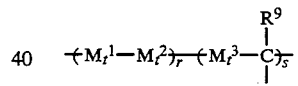

(IX)

Linking Group-Functional Group wherein $M_r^1$, $M_r^2$, $M_r^3$ each represents a methylene group, which may optionally be substituted by substituent(s) selected from, for example, an alkyl group (e.g., methyl, ethyl), an aryl group (e.g., phenyl, 2-tolyl, 3-tolyl, 4-tolyl, 1-naphthyl, 2-naphthyl) and an alkoxycarbonyl group (e.g., methoxycarbonyl, ethoxycarbonyl); $R^9$ represents a hydrogen atom, an alkyl group (e.g., methyl-, ethyl), or an aryl group (e.g., phenyl, 2-tolyl, 3-tolyl, 4-tolyl, 1-naphthyl, 2-naphthyl); and the ratio of r to s is from 0 to 4.

Especially preferred examples of the high polymer for use in the present invention may be represented by the following formula (IV):

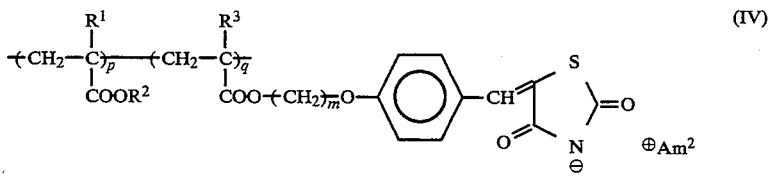

(IV)

wherein $R^1$ and $R^3$ may be the same as or different from each other and each represents a hydrogen atom or a methyl group;

$R^2$ represents an alkyl group;

Am²⊕ represents a primary to tertiary ammonium group or a proton;
m represents an integer of from 2 to 12; and
the ratio of p to q is from 0 to 4.

The alkyl group represented by R² can have generally from 1 to 30 carbon atoms, preferably from 1 to 10 carbon atoms, especially preferably from 1 to 4 carbon atoms, and examples of the alkyl group includes, for example, methyl, ethyl, propyl, isopropyl, butyl, sec-butyl and tert-butyl groups. m is preferably from 2 to 6. The ratio of p to q is preferably from 0 to 2.

The high polymer for use in the present invention has a molecular weight of generally from 1,000 to 1,000,000, preferably from 3,000 to 500,000, more preferably from 5,000 to 100,000.

Specific examples of the high polymer for use in the present invention are set forth below, which, however, are not limitative. The high polymer of the present invention may be deuterated.

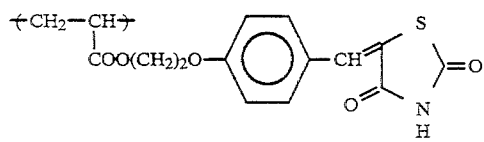 A-1
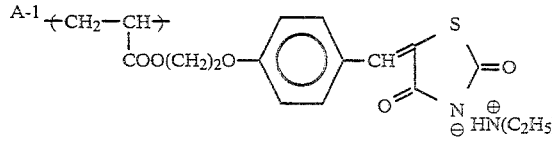 A-2

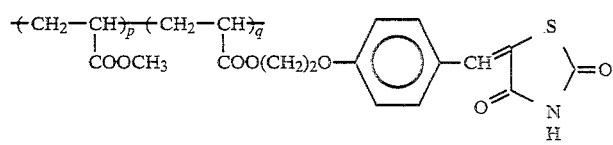 A-3

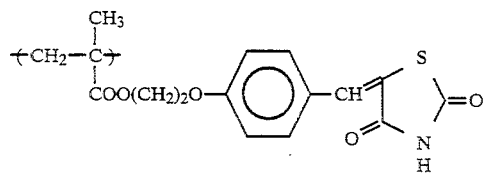 A-4
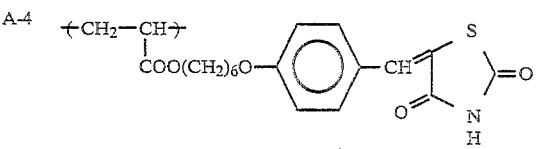 A-5

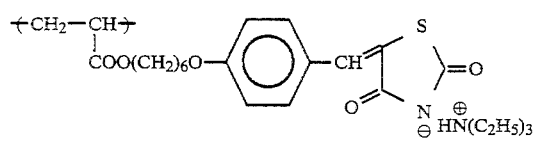 A-6
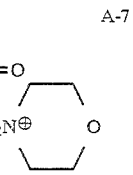 A-7

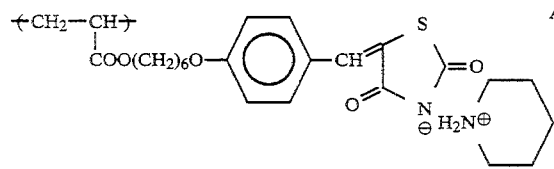 A-8
 A-9

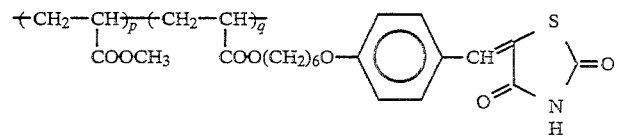 A-10

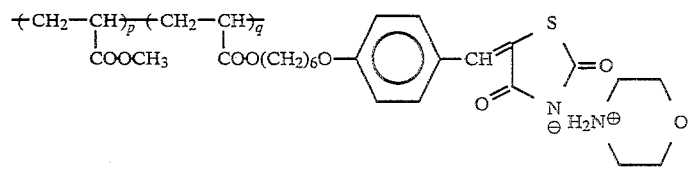 A-11

A-12

-continued
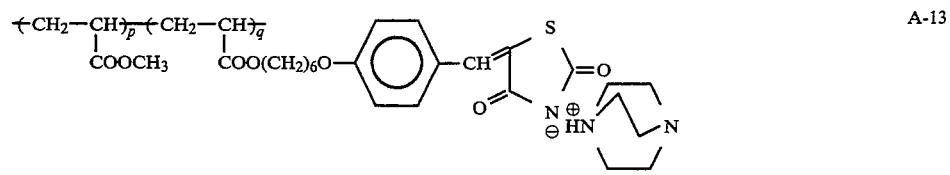
A-13
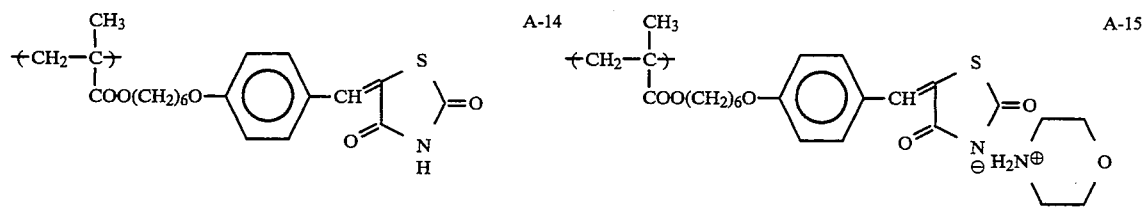
A-14 A-15
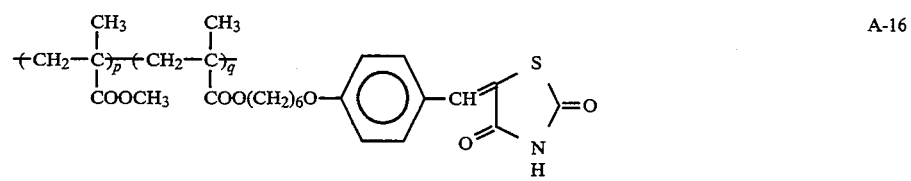
A-16
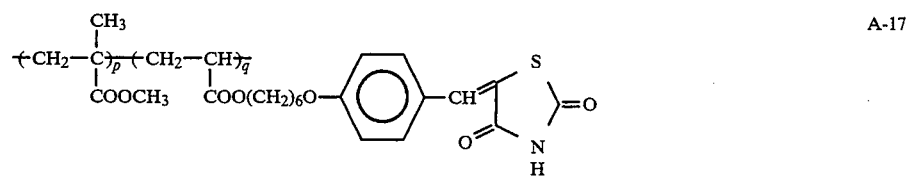
A-17
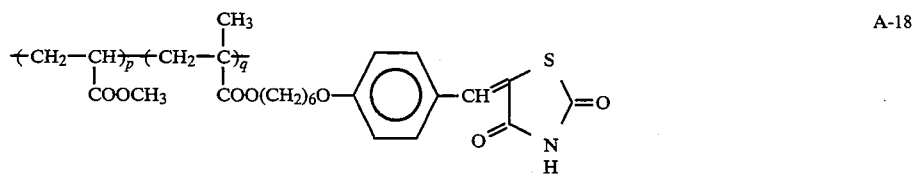
A-18
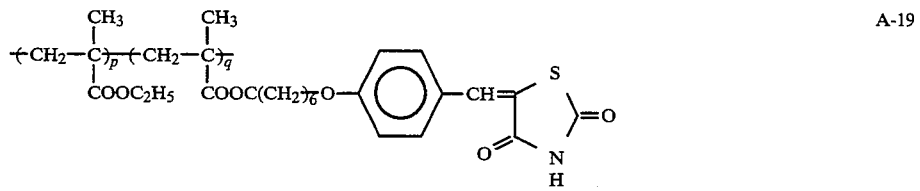
A-19
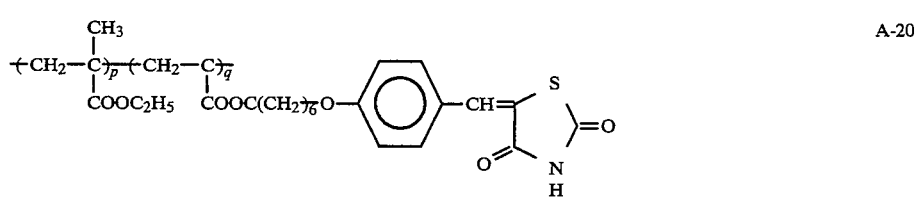
A-20
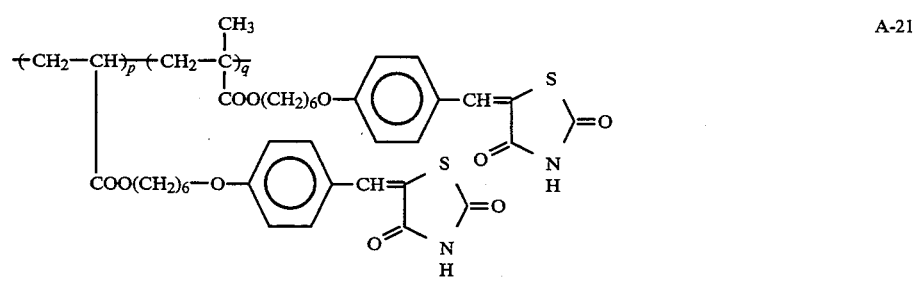
A-21

-continued
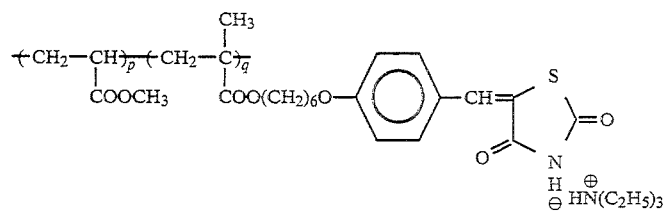
A-22
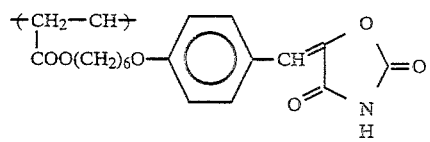
A-23
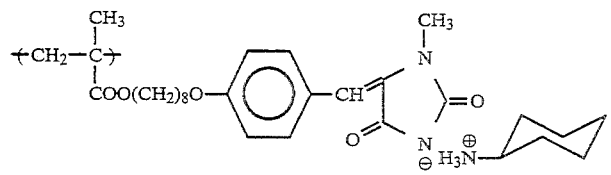
A-24
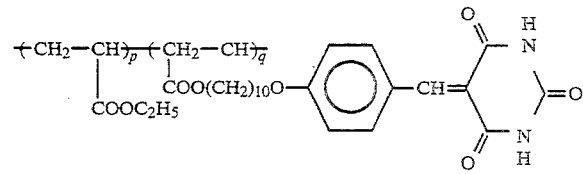
A-25
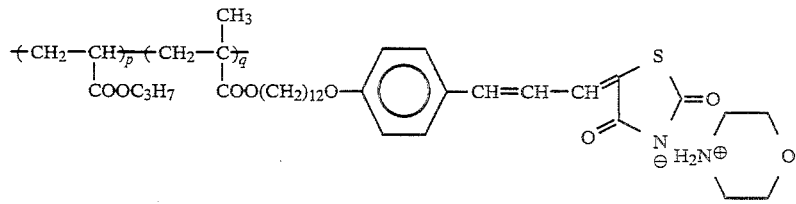
A-26
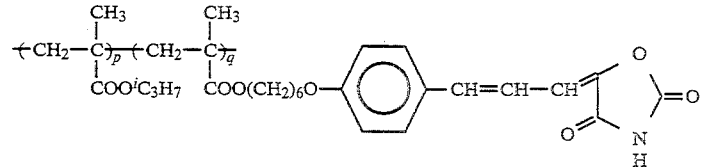
A-27
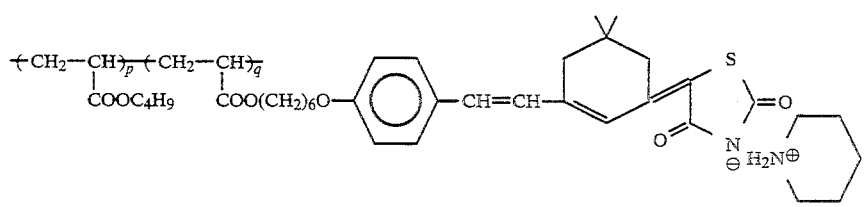
A-28
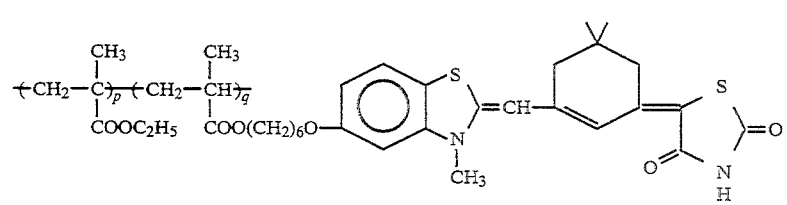
A-29

-continued

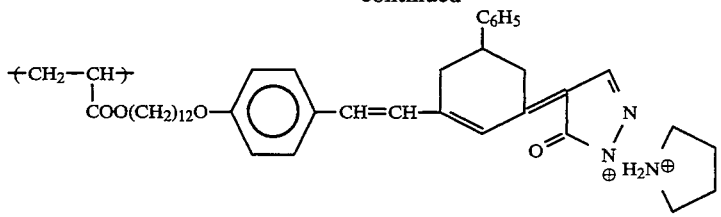
A-30

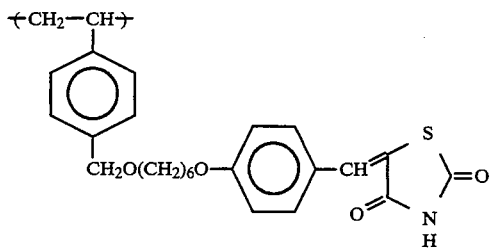
A-31

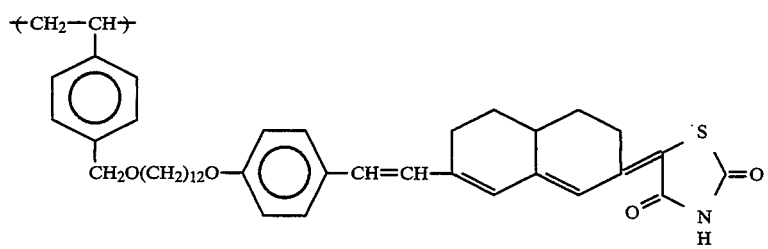
A-32

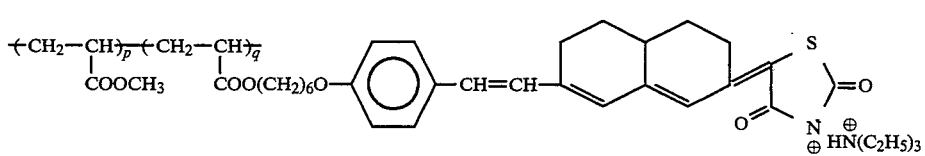
A-33 p/q = 0 to 2

The high polymer of the present invention may be produced by, for example, a solution polymerization method, a precipitation polymerization method, a suspension polymerization method, a plasma polymerization method or a vapor deposition polymerization method. At the start of the polymerization, a polymerization initiator may be used. Selection of a suitable polymerization initiator in accordance with the intended polymerization reaction may be effected, for example, with reference to New Lectures of Experimental Chemistry, Vol. 19, High Polymeric Chemistry (1), Chap. 2 (edited by Chemical Society of Japan, published by Maruzen Co., 1978).

Introduction of a π-electron-conjugated functional group into the high polymer of the present invention may be effected either into the monomers used to make the high polymer prior to their polymerization or into the finished high polymer after polymerization.

Production of the high polymer of the present invention may be effected, for example, with reference to the above-mentioned New Lectures of Experimental Chemistry, Vol. 19 and Lectures of Experimental Chemistry, 4th Ed., Vol. 28, Production of High Polymers (edited by Chemical Society of Japan, published by Maruzen Co., 1992).

As one example, production of a high polymer represented by the above-mentioned formula (IV) will be described below.

A high polymer of formula (IV) may be produced by polymerizing a compound of the following formula (V) singly or along with other acrylate monomer(s) optionally followed by converting the resulting polymer into its ammonium salt.

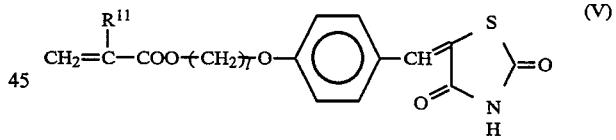
(V)

wherein $R^{11}$ represents a hydrogen atom or a methyl group; and l represents an integer of from 2 to 12, preferably from 2 to 6.

Specific examples of compounds represented by formula (V) are set forth below, which, however, are not limitative.

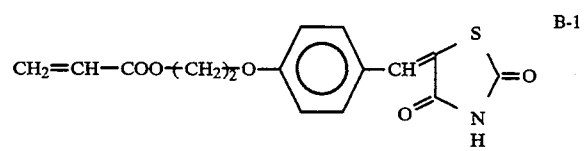
B-1

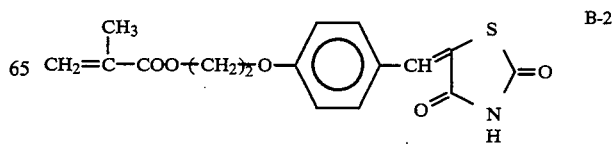
B-2

-continued

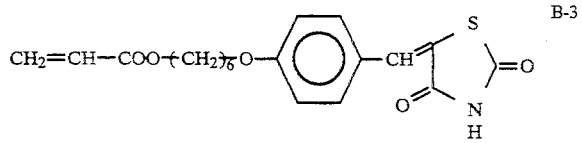
B-3

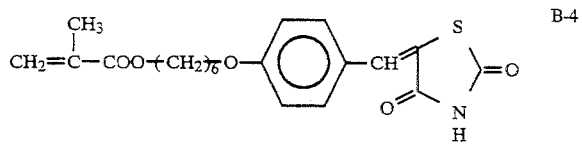
B-4

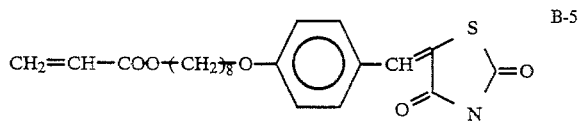
B-5

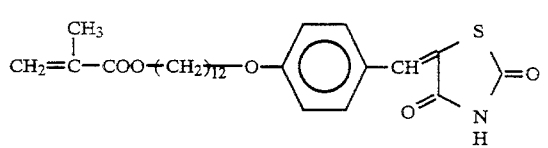
B-6

These compounds may be produced either by a method of producing a 5-benzylidenethiazolidine-2,4-dione derivative followed by esterifying the derivative into its acrylate or by a method of producing an acrylate ester of a benzaldehyde derivative followed by converting the ester into its benzylidene derivative. The benzylidene compound may be obtained by Knoevenagel reaction of the benzaldehyde derivative and thiazolidine-2,4-dione. Examples of the solvent for the reaction include alcohols, ethers, nitriles and amides. As the catalyst for the same reaction, acids or bases can be used.

The reaction temperature may be generally from −100° C. to 150° C., preferably from −78° C. to 120° C., more preferably from 30° C. to 100° C.

The esterification may be effected by reaction of the derivative with an acrylic acid halide and an alcohol. As examples of the solvent for the reaction, ethers, nitriles and halogenated hydrocarbons can be used as examples of the solvent for the same reaction. Also a bases can be used as a catalyst for the same reaction.

The reaction temperature may be generally from −100° C. to 50° C., preferably from −78° C. to 30° C., more preferably from −25° C. to 15° C.

Where the high polymer material of the present invention is used as a nonlinear optical material, it may be utilized not only as a nonlinear optical material of the second degree but also as a nonlinear optical material of the third degree or higher degrees. The use of the material as a nonlinear optical material includes, for example, use in wavelength converting devices, optical polarizers, optical matrix switches, space optical modulation devices, optical histability devices and phase conjugation devices.

The present invention will be explained in more detail by way of the following examples, which, however, are not intended to restrict the scope of the present invention. Unless otherwise indicated, all parts, percents, ratios and the like are by weight.

EXAMPLE 1

Production of Compound (B-1)

a) Production of 4-(2-hydroxyethoxy)benzaldehyde 12.2 g (0.1 mol) of 4-hydroxybenzaldehyde, 16.6 g (0.12 mol) of potassium carbonate and 100 ml of N,N-dimethylformamide were put in a three-neck 300 ml-flask equipped with a thermometer and a stirrer and heated up to 60° C. To this mixture was dropwise added 25.0 g (0.2 mol) of 2-bromoethanol. The internal temperature rose up to 80° C. due to the reaction heat. Afterwards, the reaction system was heated and stirred at 100° C. for 2 hours. The reaction mixture was cooled to room temperature, poured into water and extracted with ethyl acetate. The resulting extract was dried with anhydrous sodium sulfate, and ethyl acetate was removed therefrom by distillation. The residue was subjected to silica gel column chromatography (using an eluent of ethyl acetate/n-hexane of 1/1) to obtain the intended 4-(2-hydroxyethoxy)benzaldehyde as an oily product. The yield of the product was 5.8 g (34.9%).

$^1$H-NMR of the product was measured in CDCl$_3$ (deuterochloroform) to obtain the following data.

δ 2.17 ppm (bs, 1H), 4.04 (t, 2H), 4.20 (t, 2H), 7.01 (d, 2H), 7.85 (d, 2H), 9.90 (s, 1H).

b) Production of 4-(2-acryloyloxyethoxy)benzaldehyde 5.8 g (0.035 mol) of 4-(2-hydroxyethoxy)benzaldehyde, 6 ml of triethylamine, a small amount (200 mg or less) of hydroquinone and 80 ml of acetonitrile were put in a three-neck 200 ml-flask equipped with a thermometer and a stirrer and cooled to 0° C. To this mixture was dropwise added a solution comprising 3.5 g (0.039 mol) of acryloyl chloride and 8 ml of acetonitrile at 5° C. or lower. After the addition, the reaction system was stirred at 0° C. for 2 hours. The reaction mixture was poured into water containing ice and extracted with ethyl acetate. The resulting extract was dried with anhydrous sodium sulfate, and ethyl acetate was removed therefrom by distillation. The residue was subjected to silica gel column chromatography (using an eluent of ethyl acetate/n-hexane of 1/1 by volume) to obtain the intended 4-(2-acryloyloxyethoxy)benzaldehyde as an oily product. The yield of the product was 4.1 g (53.2%).

$^1$H-NMR of the product was measured in CDCl$_3$ (deuterochloroform) to obtain the following data.

δ 4.35 ppm (t, 2H), 4.57 (t, 2H), 5.88 (dd, 1H), 6.15 (dd, 1H), 6.46 (dd, 1H), 7.01 (d, 2H), 7.82 (d, 2H), 9.90 (s, 1H).

c) Production of Compound (B-1)

3.0 g (0.014 mol) of 4-(2-acryloyloxyethoxy)benzaldehyde, 1.6 g (0.014 mol) of thiazolidine-2,4-dione, 0.63 g of ammonium acetate, 0.8 ml of acetic acid, a small amount (200 mg or less) of hydroquinone and 16 ml of acetonitrile were heat-refluxed in an eggplant-type 50 ml-flask equipped with a reflux condenser for 3 hours. After the reaction mixture was cooled to room temperature, the mixture was poured into water containing ice. The precipitates thus-formed were taken out by filtration and washed with water. After being dried by airing, the dried powder was subjected to silica gel column chromatography (using an eluent of chloroform) to obtain the intended Compound (B-1). The yield of the product was 2.3 g (51.5%).

$^1$H-NMR of the product was measured in DMSO-d$_6$ (Dimethyl Sulfoxide-d$_6$) to obtain the following data.

δ 4.35 ppm (m, 2H), 4.48 (m, 2H), 5.98 (dd, 1H), 6.20 (dd, 1H), 6.35 (dd, 1H), 7.13 (d, 2H), 7.54 (d, 1H), 7.76 (s, 1H), 12.53 (bs, 1H).

EXAMPLE 2

Production of Compound (B-3)

a) Production of 4-(6-hydroxyhexyloxy)benzaldehyde 2.44 g (0.02 mol) of 4-hydroxybenzaldehyde, 2.73 g (0.02 mol) of 6-chlorohexanol, 1.66 g (0.012 mol) of potassium carbonate and 20 ml of N,N-dimethylformamide were put in a three-neck 50 ml-flask equipped with a stirrer and a thermometer and heated at 100° C. for 2 hours with stirring. The reaction mixture was cooled to room temperature, poured into water containing ice and extracted with ethyl acetate. The resulting extract was dried with anhydrous sodium sulfate, and ethyl acetate was removed therefrom by distillation. The oily residue was allowed to stand at room temperature, whereupon it gradually crystallized. By silica gel thin layer chromatography (using a developer of ethyl acetate), the purity of the crystals was high. The yield of the product was 4.4 g (99.0%).

The crystals were recrystallized from a mixed solvent of ethyl acetate and n-hexane. The yield of the product was 2.2 g (49.5%). The product had a melting point of from 43.0° to 43.5° C.

$^1$H-NMR of the product was measured in CDCl$_3$ (deuterochloroform) to obtain the following data.

δ 1.35 to 1.95 ppm (m, 8H), 3.69 (t, 2H), 4.05 (t, 2H), 7.10 (d, 2H), 7.82 (d, 2H), 9.90 (s, 1H).

b) Production of 4-(6-acryloyloxyhexyloxy)benzaldehyde 8.9 g (0.04 mol) of 4-(6-hydroxyhexyloxy)benzaldehyde, 6.8 ml of triethylamine and 100 ml of acetonitrile were put in a three-neck flask equipped with a thermometer and a stirrer and cooled to 0° C. To this mixture was dropwise added a solution comprising 4.0 g (0.044 mol) of acryloyl chloride and 10 ml of acetonitrile with stirring at 0° C. to 5° C. After the addition, the whole mixture was stirred for one hour at 0° C. and poured into water containing ice. The crystals which precipitated out after a while were taken out by filtration, washed with water and dried by airing to obtain the intended compound. The yield of the product was 3.94 g (35.7%). The product had a melting point of 30° C. or lower.

$^1$H-NMR of the product was measured in CDCl$_3$ (deuterochloroform) to obtain the following data.

δ 1.25 to 1.95 ppm (m, 8H), 4.05 (t, 2H), 4.18 (t, 2H), 5.81 (dd, 1H), 6.12 (q, 1H), 6.40 (dd, 1H), 6.98 (d, 2H), 7.82 (d, 2H), 9.86 (s, 1H).

c) Production of Compound (B-3)

3.9 g (0.014 mol) of 4-(6-acryloyloxyhexyloxy)benzaldehyde, 1.65 g (0.014 mol) of thiazolidine-2,4-dione, 0.65 g of ammonium acetate, 0.8 ml of acetic acid, 0.2 g of hydroquinone and 15 ml of acetonitrile were put in an eggplant-type 50 ml-flask equipped with a reflux condenser and heat-refluxed therein for one hour. The reaction mixture was cooled to room temperature and poured into water containing ice. The precipitates thus-formed were taken out by filtration, washed with water and dried by airing. The solid thus-obtained was dissolved in 150 ml of dichloromethane, the insoluble substances were removed from the resulting solution, and acetonitrile was added thereto. Dichloromethane was removed from the solution by distillation under reduced pressure, and the crystals thus-formed were taken out by filtration to obtain the intended product. The yield of the product was 2.8 g (53.3%).

$^1$H-NMR of the product was measured in CDCl$_3$ (deuterochloroform) to obtain the following data.

δ 1.33 to 2.00 ppm (m, 8H), 4.04 (t, 2H), 4.19 (t, 2H), 5.84 (dd, 1H), 6.12 (dd, 1H), 6.42 (dd, 1H), 7.00 (d, 2H), 7.45 (d, 2H), 8.82 (s, 1H).

EXAMPLE 3

Production of Compound (B-4)

a) Production of 4-(6-methacryloyloxyhexyloxy)benzaldehyde

The same reaction as in Production of 4-(acryloyloxy)benzaldehyde in Example 2 was carried out, except that 4.6 g (0.044 mol) of methacryloyl chloride was used in place of 4.0 g (0.044 mol) of acryloyl chloride. The thus-obtained reaction mixture was poured into water containing ice and extracted with ethyl acetate. The resulting extract was washed with a sodium hydrogen carbonate aqueous solution and further washed with water. The washed extract was dried with anhydrous sodium sulfate and then subjected to silica gel column chromatography (using a developer of hexane/ethyl acetate of 1/1 by volume) to obtain the purified intended compound as an oily product. The yield of the product was 9.9 g (85.9%).

$^1$H-NMR of the product was measured in CDCl$_3$ (deuterochloroform) to obtain the following data.

δ 1.25 to 2.20 ppm (m, 11H), 4.05 (t, 2H), 4.18 (t, 2H), 5.57 (s, 1H), 6.12 (s, 1H), 7.10 (d, 2H), 7.81 (d, 2H), 9.90 (s, 1H).

b) Production of Compound (B-4)

9.9 g (0.034 mol) of 4-(6-methacryloyloxyhexyloxy)-benzaldehyde, 4.0 g (0.034 mol) of thiazolidine-2,4-dione, 1.56 g of ammonium acetate, 1.9 ml of acetic acid, 0.5 g of hydroquinone and 35 ml of acetonitrile were put in an eggplant-type 100 ml-flask equipped with a reflux condenser and heat-refluxed therein for one hour. The reaction mixture was cooled to room temperature and poured into water containing ice. The precipitates thus-formed were taken out by filtration, washed with water and dried by airing. The solid thus-obtained was dissolved in 150 ml of dichloromethane, the insoluble substance was removed from the resulting solution, and acetonitrile was added thereto. Dichloromethane was removed from the solution by distillation under reduced pressure, and the crystals thus-formed were taken out by filtration to obtain the intended product. The yield of the product was 5.8 g (43.9%).

$^1$H-NMR of the product was measured in CDCl$_3$ (deuterochloroform) to obtain the following data.

δ 1.35 to 2.10 (m, 11H), 4.04 (t, 2H), 4.17 (t, 2H), 5.55 (s, 1H), 6.11 (s, 1H), 7.11 (d, 2H), 7.47 (d, 2H), 7.83 (s, 1H), 8.06 (s, 1H)

EXAMPLE 4

Production of Compound (A-1)

1.1 g of Compound (B-1), 0.1 g of azobisisobutyronitrile (AIBN) and 25 ml of THF were put in an eggplant-type 50 ml-flask equipped with a reflux condenser and heat-refluxed therein for 8 hours in nitrogen stream. 0.1 g of AIBN was added thereto, and the whole mixture was heat-refluxed for 10 hours further in a nitrogen stream. After the mixture was cooled to room temperature, the insoluble substances were removed, and n-hexane was added. The supernatant was removed by decantation, and the residue was washed with ethyl acetate and subjected to decantation. Thus, a resinous product was obtained. The yield of the product was 0.34 g (30.9%).

$^1$H-NMR of the product was measured in DMSO-$d_6$ (Dimethyl Sulfoxide-$d_6$) with the result that the vinyl proton derived from the acrylate group ($\delta$ 5.8 to 6.5 ppm) disappeared and the signal was broadened. From the results, it was obvious that the polymerization of Compound (B-1) went on to give a high polymer.

The molecular weight of the product as measured with a vapor pressure osmometer was 9,800. Its Tg as measured with DSC (Differential Scanning Calorimeter) was 250° C. or higher.

EXAMPLE 5

Production of Compound (A-5)

1.55 g (4.13 mmol) of Compound (B-3), 0.15 g of azobisisobutyronitrile (AIBN) and 30 ml of 1.2-dimethoxyethane were put in an eggplant-type 50 ml-flask equipped with a reflux condenser and heat-refluxed therein for 20 hours in a nitrogen stream. After the mixture was cooled to room temperature, n-hexane was added. The supernatant was removed by decantation, and ethyl acetate and n-hexane were added to the residue in this order. The supernatant was again removed by decantation, and the same operation as above was repeated once again. A resinous product was formed, which was heated and dried at 60° C. The yield of the product thus-obtained was 1.05 g (67.7%).

$^1$H-NMR of the product was measured in CDCl$_3$ with the result that the vinyl proton derived from the acrylate group ($\delta$ 5.8 to 6.5 ppm) disappeared and the signal was broadened. From the results, it was obvious that the polymerization of Compound (B-3) went on to give a high polymer.

The molecular weight of the product as measured with a vapor pressure osmometer was 10,500. its Tg as measured with DSC (Differential Scanning Calorimeter) was 227° C.

EXAMPLE 6

Production of Compound (A-10)

1.55 g (4.13 mmol) of Compound (B-3), 0.36 g (4.13 mmol) of methyl acrylate, 0.30 g of AIBN and 30 ml of 1,2-dimethoxyethane were put in an eggplant-type 50 ml-flask equipped with a reflux condenser and heat-refluxed therein for 7 hours in-a nitrogen stream. 0.10 g of AIBN was added thereto, and the whole mixture was heat-refluxed for 10 hours further in a nitrogen stream. After the mixture was cooled to room temperature, the reaction mixture was treated in the same manner as in Example 5 to obtain the intended product. The yield of the product was 1.22 g (63.9%).

$^1$H-NMR of the product was measured in DMSO-$d_6$ (Dimethyl Sulfoxide-$d_6$) with the result that the vinyl proton derived from the acrylate group ($\delta$5.8 to 6.5 ppm) disappeared and the signal was broadened. From the results, it was obvious that the polymerization of Compound (B-3) went on to give a high polymer. From the intensities of the signals derived from —OCH$_3$ ($\delta$ 3.49 ppm) and —O—CH$_2$— ($\delta$ 4.00 ppm), the p/q ratio was determined to be 0.316.

The molecular weight of the product as measured with a vapor pressure osmometer was 21,000. Its Tg as measured with DSC was 300° C. or higher.

EXAMPLE 7

Production of Compound (A-14)

2.9 g (7.45 mmol) of Compound (B-4), 0.29 g of azobisisobutyronitrile (AIBN) and 30 ml of 1,2-dimethoxyethane were put in an eggplant-type 50 ml-flask equipped with a reflux condenser and heat-refluxed therein for 24 hours in a nitrogen stream. After the mixture was cooled to room temperature, the reaction mixture was treated in the same manner as in Example 5 to obtain the intended product. The yield of the product was 1.34 g (46.2%).

$^1$H-NMR of the product was measured in DMSO-$d_6$ (Dimethyl Sulfoxide-$d_6$) with the result that the vinyl proton derived from the acrylate group ($\delta$ 5.8 to 6.2 ppm) disappeared and the signal was broadened. From the results, it was obvious that the polymerization of Compound (B-4) went on to give a high polymer.

The number average molecular weight of the product as measured with GPC (Gel Permeation Chromatography) was 4590. Its Tg as measured with DSC (Differential Scanning Calorimeter) was 184.5° C.

EXAMPLE 8

Production of Compound (A-18)

2.1 g (5.3 mmol) of Compound (B-4), 0.46 g (5.3 mmol) of methylacrylate, 0.20 g of azobisisobutyronitrile (AIBN) and 20 ml of 1,2-dimethoxyethane were put in an eggplant-type 50 ml-flask equipped with a reflux condenser and heat-refluxed therein for 24 hours in a nitrogen stream. After the mixture was cooled to room temperature, the reaction mixture was treated in the same manner as in Example 5 to obtain the intended product. The yield of the product was 1.85 g (72.3%).

The number average molecular weight of the product as measured with GPC (Gel Permeation Chromatography) was 5960. Its Tg as measured with DSC (Differential Scanning Calorimeter) was 201.0° C.

EXAMPLE 9

Production of Compound (A-19)

2.9 g (7.45 mmol) of Compound (B-4), 0.85 g (7.45 mmol) of ethylmethacrylate, 0.29 g of azobisisobutyronitrile (AIBN) and 30 ml of 1,2-dimethoxyethane were put in an eggplant-type 50 ml-flask equipped with a reflux condenser, and afterward the same process as in Example 8 was carried out to obtain the intended product. The yield of the product was 1.14 g (30.7%).

The number average molecular weight of the product as measured with GPC (Gel Permeation Chromatography) was 9530. Its Tg as measured with DSC (Differential Scanning Calorimeter) was 215° C.

EXAMPLE 10

Production of Compound (A-20)

2.0 g (5.3 mmol) of Compound (B-3), 0.61 g (5.3 mmol) of ethylmethacrylate, 0.20 g of azobisisobutyronitrile (AIBN) and 20 ml of 1,2-dimethoxyethane were put in an eggplant-type 50 ml-flask equipped with a reflux condenser, and afterward the same process as in Example 8 was carried out to obtain the intended product. The yield of the product was 0.98 g (37.5%).

The number average molecular weight of the product as measured with GPC (Gel Permeation Chromatography) was 5900. Its Tg as measured with DSC (Differential Scanning Calorimeter) was 189° C.

EXAMPLE 11

Production of Compound (A-21)

0.9 g (2.4 mmol) of Compound (B-3), 1.0 g (2.6 mmol) of Compound (B-4), 0.20 g of azobisisobutyronitrile (AIBN) and 20 ml of 1,2-dimethoxyethane were put in an eggplant-type 50 ml-flask equipped with a reflux condenser, and afterward the same process as in Example 8 was carried out to obtain the intended product. The yield of the product was 0.91 g (48%).

The number average molecular weight of the product as measured with GPC (Gel Permeation Chromatography) was 4300. Its Tg as measured with DSC (Differential Scanning Calorimeter) was 188° C.

EXAMPLE 12

Production of Compound (A-2)

0.1 g of Compound (A-1) and 20 ml of dichloromethane were put in an eggplant-type 50 ml-flask equipped with a stirrer, and 1 ml of triethylamine was added thereto with stirring. In 5 minutes, almost all the compounds were dissolved, and the insoluble substances were removed from the resulting solution. The solution was poured into a laboratory dish (i.e., Petri dish) and left as it was overnight in a draft. A resinous substance was formed, which was not solidified completely. The reason for this is considered to be because the Tg of the product was not more than room temperature.

$^1$H-NMR of the product was measured in CDCl$_3$ (deuterochloroform) to give a signal derived from triethylamine ($\delta$ 1.35 ppm t, 3.25 q).

EXAMPLE 13

Production of Compound (A-6)

Using 0.1 g of Compound (A-5), the same process as in Example 6 was repeated, with the same results being obtained.

EXAMPLE 14

Production of Compound (A-7)

Using 0.1 g of Compound (A-5), the same process as in Example 6 was repeated, except that triethylamine was replaced by morpholine. After evaporation of the solvent and the excess morpholine, the product was solidified to give a high polymer film. This film was taken out, and its $^1$H-NMR and Tg were measured.

$^1$H-NMR of the product was measured in CDCl$_3$ (deuterochloroform) to give a signal of morpholine ($\delta$3.00 ppm t, 3.69 ppm t). The Tg of the product was 24° C.

EXAMPLE 15

Production of Compound (A-11)

Using 0.1 g of Compound (A-10), the same process as in Example 6 was repeated, with the same results being obtained.

EXAMPLE 16

Production of Compound (A-12)

Using 0.1 g of Compound (A-10), the same process as in Example 8 was repeated. Regarding $^1$H-NMR, the same results were obtained. The Tg of the product was 35° C.

EXAMPLE 17

Production of Compound (A-15)

Using 0.1 g of Compound (A-14), the same process as in Example 14 was repeated. Regarding $^1$H-NMR, the same results were obtained. The Tg of the product was 41° C.

EXAMPLE 18

Production of Compound (A-22)

Using 0.1 g of Compound (A-18), the same process as in Example 12 was repeated. Regarding $^1$H-NMR, the same results were obtained. The Tg of the product was 30° C.

EXAMPLE 19

Removal of amine moiety from high polymer amine salt by heating

Compound (A-7) and Compound (A-12) were subjected to DSC (Differential Scanning Calorimeter) measurement. Compound (A-7) gave a sharp endothermic peak at 157° C., and Compound (A-12) gave a sharp endothermic peak at 175.5° C. The data indicated removal of the amine moiety from the compounds.

EXAMPLE 20

Formation of electric field-oriented polymer film and experiment regarding second harmonic generation (SHG) with the film 0.2 g of Compound (A-1) and 2.5 ml of chloroform were put in a test tube, and 0.5 ml of triethylamine was added thereto. After ultrasonic waves were imparted thereto for 5 minutes, the insoluble substances were removed. The whole of the resulting solution was dropped onto an ITO-coated glass plate, which was coated with the solution by spin-coating (rotary speed: 4000 rpm).

The same process was repeated, except that triethylamine was replaced by morpholine or piperidine and that Compound (A-1) was replaced by Compound (A-10).

The thickness of the thin film formed was about 5 μm in every experiment. The film was kept at 30° C. for 24 hours and then oriented in an electric field by a corona-poling method.

The condition for the corona-poling was as follows:
Voltage to corona wire: −10 kV
Temperature:
Condition A:
 After the film was kept at 50° C. for 1.5 hours, it was heated up to 150° C. at a rate of 1° C./min. It was then kept at 150° C. for 30 minutes and thereafter cooled to 40° C. over a period of one hour.
Condition B:
 After the film was kept at 50° C. for 3 hours and 40 minutes, it was kept at 40° C. for one hour (including the time needed for cooling it to 40° C.).

After the electric field orientation, the SHG of the oriented film was immediately measured by the use of the device shown in FIG. 1. The results obtained are shown in Table 1 below.

TABLE 1

| Sample No. | Compound | Amine | Temperature Condition | SHG (relative intensity) | Remarks |
|---|---|---|---|---|---|
| 1 | A-1 | triethylamine | A | 100 | |
| 2 | A-1 | morpholine | A | 115 | |
| 3 | A-1 | piperidine | A | 97 | |
| 4 | A-10 | triethylamine | A | 85 | |
| 5 | A-10 | morpholine | A | 88 | |
| 6 | A-10 | piperidine | A | 80 | |
| 7 | A-1 | triethylamine | B | 104 | |
| 8 | A-10 | triethylamine | B | 91 | |
| 9 | A-1 | triethylamine | A | 0 | No application of electric field |
| 10 | A-1 | triethylamine | B | 0 | No application of electric field |

EXAMPLE 21

Samples Nos. 1 to 8 of Example 20 were stored at 30° C. for 3 months, and then their SHG was measured. The results obtained are shown in Table 2 below.

TABLE 2

| Sample No. | Compound | Amine | Temperature Condition | SHG (3 months stored sample/fresh sample) |
|---|---|---|---|---|
| 1 | A-1 | triethylamine | A | 98 |
| 2 | A-1 | morpholine | A | 97 |
| 3 | A-1 | piperidine | A | 97 |
| 4 | A-10 | triethylamine | A | 95 |
| 5 | A-10 | morpholine | A | 95 |
| 6 | A-10 | piperidine | A | 96 |
| 7 | A-1 | triethylamine | B | 35 |
| 8 | A-10 | triethylamine | B | 38 |

As is apparent from the results of the examples set forth above, it is understood that the high polymer material of the present invention is useful as an organic nonlinear optical material. In particular, as demonstrated in Example 21, the nonlinear optical material samples as produced in accordance with the method of the present invention had excellent stability to storage.

While the invention has been described in detail and with reference to specific embodiments thereof, it will be apparent to one skilled in the art that various changes and modifications can be made therein without departing from the spirit and scope thereof.

What is claimed is:

1. A high polymer capable of forming a hydrogen bond, wherein said high polymer contains a functional group having an electron-donating group at one end of a π-electron-conjugated system and an electron-attracting group at the other end of the π-electron-conjugated system; and said high polymer is represented by formula (VIII'):

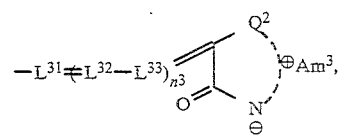

wherein the linking group represents

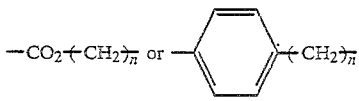

wherein n is an integer of 0 to 24;

$M_t^1$, $M_t^2$ and $M_t^3$ each represents a methylene group which is optionally substituted by substituent(s) selected from the group consisting of an alkyl group, an aryl group, and an alkoxycarbonyl group;

$R^9$ represents a hydrogen atom or a methyl group; the ratio of r to s is from 0 to 4;

$L^{31}$, $L^{32}$ and $L^{33}$ each represents a methine group;

$Q^2$ represents an atomic group necessary for forming 2-pyrazoline-5-one, imidazolin-4-one, oxazolidone-2,4-dione or thiazolidine-2,4-dione;

$Am^{3\oplus}$ represents a primary to tertiary ammonium group or a proton;

$l^3$ represents an integer of from 2 to 12; and n represents an integer of from 0 to 3.

2. The high polymer capable of forming a hydrogen bond as claimed in claim 1, wherein said functional group is capable of forming a hydrogen bond in a head to tail state.

3. A high polymer which is a precursor capable of forming a hydrogen bond, wherein said high polymer contains a functional group having an electron-donating group at one end of a π-electron-conjugated system and an electron-attracting group at the other end of the π-electron-conjugated system; and said high polymer is represented by formula (IV):

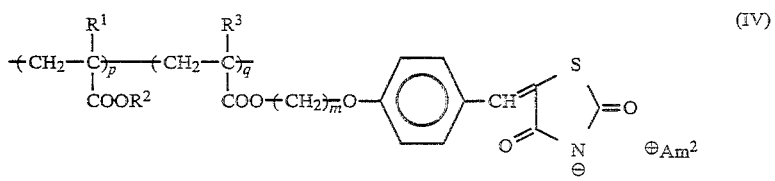

wherein $R^1$ and $R^2$ may be the same as or different from each other and each represents a hydrogen atom or a methyl group; $R^2$ represents an alkyl group; $Am^2$ represents a primary to tertiary ammonium group or a proton; m represents an integer of 2 to 12; and the ratio of p to q is from 0 to 4.

4. The high polymer which is a precursor capable of forming a hydrogen bond as claimed in claim 3, wherein said functional group is capable of forming a hydrogen bond at a temperature of 40° C. or more in the head to tail state.

5. A high polymer capable of forming a hydrogen bond wherein said high polymer contains a functional group having an electron-donating group at one end of a π-electron-conjugated system and an electron-attracting group at the other end of the π-electron-conjugated system; and said high polymer is formed by polymerization of a monomer comprising a compound represented by formula (V):

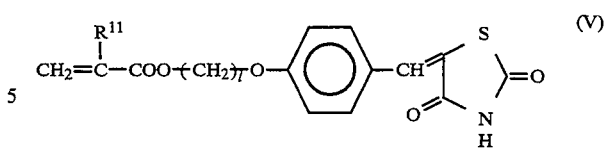

wherein $R^{11}$ represents a hydrogen atom or a methyl group; and l represents an integer of from 2 to 12.

* * * * *